H. D. NOBLES.
GREASE FILTER.
APPLICATION FILED OCT. 7, 1909.
1,014,843.
Patented Jan. 16, 1912.
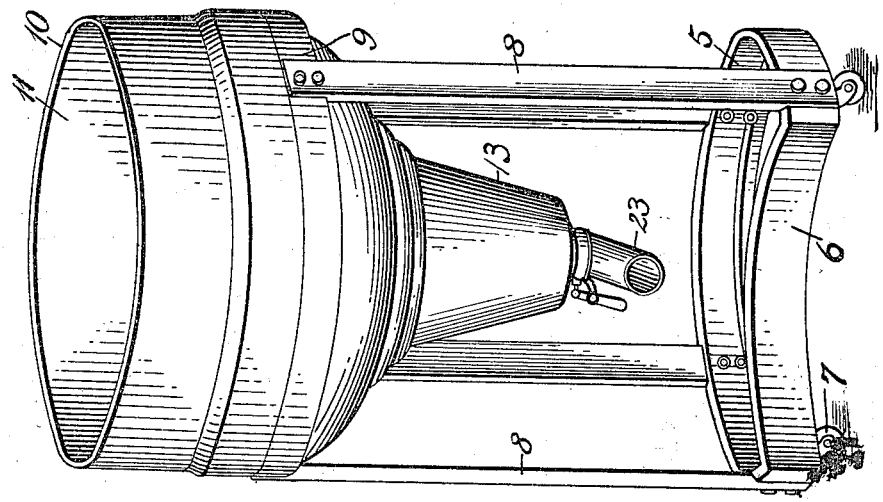
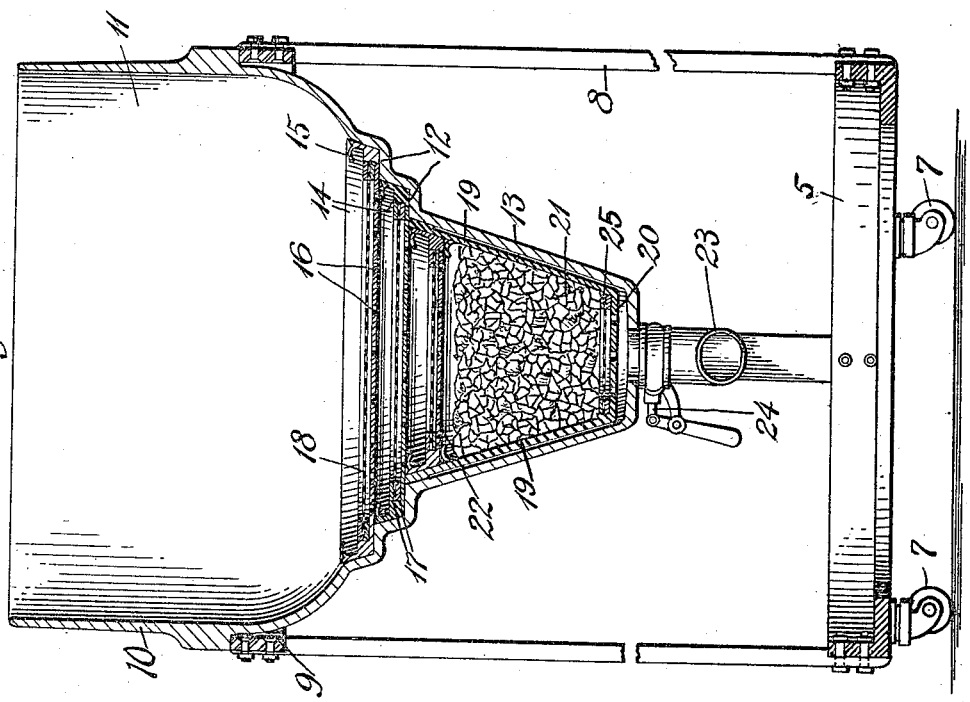
WITNESSES:
INVENTOR.
Harrison D. Nobles,
BY
Arthur B. Jenkins,
ATTORNEY.

UNITED STATES PATENT OFFICE.

HARRISON D. NOBLES, OF EAST HARTFORD, CONNECTICUT.

GREASE-FILTER.

1,014,843. Specification of Letters Patent. Patented Jan. 16, 1912.

Application filed October 7, 1909. Serial No. 521,441.

*To all whom it may concern:*

Be it known that I, HARRISON D. NOBLES, a citizen of the United States, and a resident of East Hartford, in the county of Hartford and State of Connecticut, have invented a new and Improved Grease-Filter, of which the following is a specification.

My improvement relates generally to the class of devices for separating the heavier and solid matter from liquids, and the object of the invention is to provide a device more especially suitable for filtering hot grease especially used by bakers in the preparation of various foods.

One form of device in the use of which the objects sought may be attained is illustrated in the accompanying drawings, in which—

Figure 1 is a perspective view of a filter embodying my invention. Fig. 2 is a view on enlarged scale in central vertical section through the device.

In the preparation of foods which are cooked by immersion in hot grease, and especially in the frying of doughnuts, crullers and the like it has been a common practice to allow the grease to cool to a certain extent and the heavier particles of dough, flour and the like to settle to the bottom, after which the liquid is poured off. More or less of the grease, dough and flour adhere to the sides of the kettles in this operation, which by reason of the difficulty attending its removal is allowed to remain with the consequence that in subsequent operations the sediment is burned on to the sides of the vessel and becomes more or less detrimentally impregnated with the grease. This grease is heated to a very high degree, and in order to secure the best results it is essential that it shall be filtered in this hot state, and the requirements of a device for filtering this hot grease are that it shall be such as not to be injuriously affected by the grease filtered therein. Soldered joints, therefore, become impractical for the reason that the solder will be melted and the joints destroyed. In the device herein illustrated and described these objections are removed, as no joints are employed in the construction, and the several parts are so arranged that they may be easily removed and cleaned.

In the accompanying drawings the numeral 5 denotes a base ring constructed of any suitable material and preferably having a recess 6 at its front side. Casters 7 are secured to this ring as a means of moving the filter.

Supports 8 of suitable number rise from the base ring, being secured thereto in any suitable manner, and at the upper end of these supports a filter receiving ring 9 is secured in any suitable manner.

The filter proper is supported within this ring, projecting both above and below it, this filter including a receptacle 10 preferably formed of cast metal and having a receiving chamber 11. At the bottom of this chamber shoulders 12 are formed, and below this chamber the receptacle is shaped into a pot receiving receptacle 13. Pans 14, constructed of suitable material, preferably metal, and having handles 15 at opposite sides by means of which they may be removed, are supported upon the shoulders 12. The bottom of each pan is perforated as at 16 and upon this perforated bottom a screen is located. These screens each consist of two rings 17 between which a screening fabric 18, preferably of wire mesh, is clamped, the two rings being suitably secured together as by bolts or screws so that the screen fabric may be readily removed and renewed.

The pot receiving receptacle 13 is preferably tapered from top to bottom, being smaller at the bottom, as shown in Fig. 2 of the drawings. A pot 19 conforming in shape to its receptacle is located in the latter, this pot having a perforated bottom 20. The pot is filled with a filtering agent 21 as charcoal or the like, and at the top of the receptacle a pan 22 of a construction like to that hereinbefore described is located, and consisting of the ring and screening fabric. The pan is tapered to fit the tapered inner surface of the pot, which thereby forms a support for the pan. A similar screen 25 is located at the bottom of the pot, resting upon the perforated bottom 20.

An outlet tube 23 extends from the bottom of the pot receiving receptacle 13, and this may be provided with a faucet 24 or like means for regulating the flow of fluid from the filter.

The faucet 24 may be closed and thus retain the material within the filter until such time as it is desirable to draw it off. The recesses for the pans or cups are preferably tapered and the filtering receptacle as a whole is preferably formed of a single piece seamless throughout, thus avoiding any joints to be affected by the hot material placed within the filter.

While I have shown and described herein the preferred structure embodying my invention, it will be understood that I do not limit the invention to such construction, as it may be departed from to a greater or lesser extent without avoiding the invention.

I claim—

1. A receptacle having an outlet therefrom and a recess therein, a pot constructed to closely fit said receptacle and removably located therein, said pot having a perforated bottom, a screen removably located within the casing on the bottom of said pot, a filtering medium located in the pot above said screen, a pan removably located within and resting upon the bottom of said recess in said receptacle, said recess being located outside the edge of said pot and a screen removably located in the bottom of said pan.

2. A receptacle having an outlet therefrom, a pot removably located in said receptacle and having a perforated bottom, a screen removably resting upon the bottom of said pot, a filtering medium located in the pot above said screen, a pan removably located above said pot and having a perforated bottom, and a screen removably located in the bottom of said pan.

3. A receptacle having an outlet therefrom, a pot removably located in the bottom of said receptacle, a pan having a perforated bottom removably located in said pot, a filtering medium resting upon said pan, and a second pan removably located in the receptacle above said pot, said pot and pans each having inturned handles at the upper edge thereof for removal purposes.

HARRISON D. NOBLES.

Witnesses:
ARTHUR B. JENKINS,
LENA E. BERKOVITCH.